US006684133B2

(12) United States Patent
Frye-Hammelmann et al.

(10) Patent No.: US 6,684,133 B2
(45) Date of Patent: Jan. 27, 2004

(54) CONTROL ARRANGEMENT FOR A HIGH-PRESSURE CLEANING SYSTEM

(75) Inventors: Hermann Frye-Hammelmann, Oelde (DE); Manfred Reimann, Schloss Holte-Stukenbrock (DE)

(73) Assignee: Hammelmann Maschinenfabrik GmbH, Oeled (DE)

( * ) Notice: Subject to any disclaimer, the term of this patent is extended or adjusted under 35 U.S.C. 154(b) by 211 days.

(21) Appl. No.: 09/883,953

(22) Filed: Jun. 20, 2001

(65) Prior Publication Data

US 2003/0006294 A1 Jan. 9, 2003

(30) Foreign Application Priority Data

Jun. 20, 2000 (DE) ........................................ 100 29 375

(51) Int. Cl.[7] ............................ G05D 11/00; B08B 3/00

(52) U.S. Cl. ....................... 700/283; 700/281; 700/282; 239/525

(58) Field of Search ................................ 700/275, 282, 700/283, 281; 239/525, 526, 706, 400

(56) References Cited

U.S. PATENT DOCUMENTS

| | | | | |
|---|---|---|---|---|
| 4,274,553 A | * | 6/1981 | Evers et al. | 222/146.5 |
| 4,585,168 A | | 4/1986 | Even et al. | 5/38 |
| 5,279,448 A | * | 1/1994 | Hanlin et al. | 222/132 |
| 5,711,483 A | * | 1/1998 | Hays | 239/71 |

FOREIGN PATENT DOCUMENTS

| | | |
|---|---|---|
| DE | 2521281 | 11/1975 |
| DE | 3313249 | 10/1984 |
| DE | 4340582 | 6/1995 |
| DE | 4411567 | 10/1995 |
| GB | 1466834 | 3/1977 |

* cited by examiner

*Primary Examiner*—Jayprakash N. Gandhi
(74) *Attorney, Agent, or Firm*—Barnes & Thornburg

(57) ABSTRACT

A control arrangement for a high-pressure cleaning system having a high-pressure pump and at least one spraying device, which can be connected to the high-pressure pump by high-pressure hoses, and has the following: at least one spray circuit at the spraying device, at least one analyzing circuit connected with the spray circuit, the spray circuit being connected by a conductive connection at the high-pressure hose with the machine, particularly the high-pressure pump, and at least one on/off switch and at least one oscillator by means of which a signal identifying the switching condition of the switch can be impressed on the current flow to the analyzing circuit, and one single-wire connection respectively being provided between each spray circuit and each analyzing circuit, by means of which a supply voltage can be applied to the spray circuit.

19 Claims, 4 Drawing Sheets

CONTROL ARRANGEMENT FOR A HIGH-PRESSURE CLEANING SYSTEM

The invention relates to a control arrangement for a high-pressure cleaning system having a high-pressure pump and at least one spray gun which can be connected to the high-pressure pump by way of a high-pressure line.

In the case of high-pressure spraying or cleaning systems, as used, for example, for cleaning outside walls of boats or the like, the pressures of the liquid exiting from the spray guns are extremely high. This results in special safety requirements, also with respect to other high-pressure cleaning system, particularly concerning the switching-on/switching-off and/or regulating of the pressure.

Although mechanical solutions are largely safe with respect to operating errors, because of the high occurring pressures, a signal transmission in an electromagnetic manner is preferred between the spray gun and the high-pressure distributor. This signal transmission also requires special safety measures.

Thus, it is ruled out to guide the signal from the spray gun simply from a switch at the spray gun by a two-wire line from the spray gun to the high-pressure distributor or a control circuit assigned to the latter, because malfunctioning because of line damage—for example, on sharp edges—cannot be excluded. For this reason, four-wire cables have been found to be successful for the signal transmission. The four-wire cables are equipped with relatively expensive connectors which can easily be damaged when not handled carefully.

In addition to the four-wire solution, radio controls exist which, however, are not always operable, for example, in the hull, which is full of corners.

The demand therefore exists for a reasonably priced and nevertheless safe control circuit for high-pressure cleaning systems. The creation of such a control circuit is the object of the invention.

The invention achieves this goal by a control arrangement for a high-pressure cleaning system having at least one gun circuit at the spraying device or spray gun and at least one analyzing circuit connected with the gun circuit and situated at a high-pressure distributor or at the high-pressure pump for determining the switching condition of an on/off switch on the spray gun. The at least one gun circuit is connected by a conductive connection at the high-pressure hose with the machine mass or ground, particularly the high-pressure pump, and has the on/off switch and at least one oscillator impresses a signal identifying the switching condition of the switch on the current flow to the analyzing circuit. A single-wire connection is provided between the at least one gun circuit and the at least one analyzing circuit, by means of which a supply voltage can be applied to the gun circuit.

The invention also achieves the additional partial object—which can also be considered independently—of designing the control circuit such that a faulty connection of the spray guns, particularly an exchange of the spray guns at the high-pressure distributor or at the high-pressure pump, is easily detected.

The invention achieves this separate goal by the control arrangement comprising a monitoring circuit for protecting a high-pressure cleaning system with several spray guns, which can be connected to the high-pressure cleaning system by high-pressure lines, against faulty connections and/or exchanges of the spray guns at the connections assigned to them. The monitoring circuit has closed circuits from the analyzing circuits assigned to the connections by lines to respective gun circuits on the spray guns and by the high-pressure hoses or by electric connections directly assigned to the latter back to the machine mass. In addition, a coupling-in device, assigned to each CPU, impresses a respective identification signal on the current to the gun circuit at the spray guns by the single-wire line, and a sensor, preferably a current detector, is assigned to each connection for sensing the variation of the current signal.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
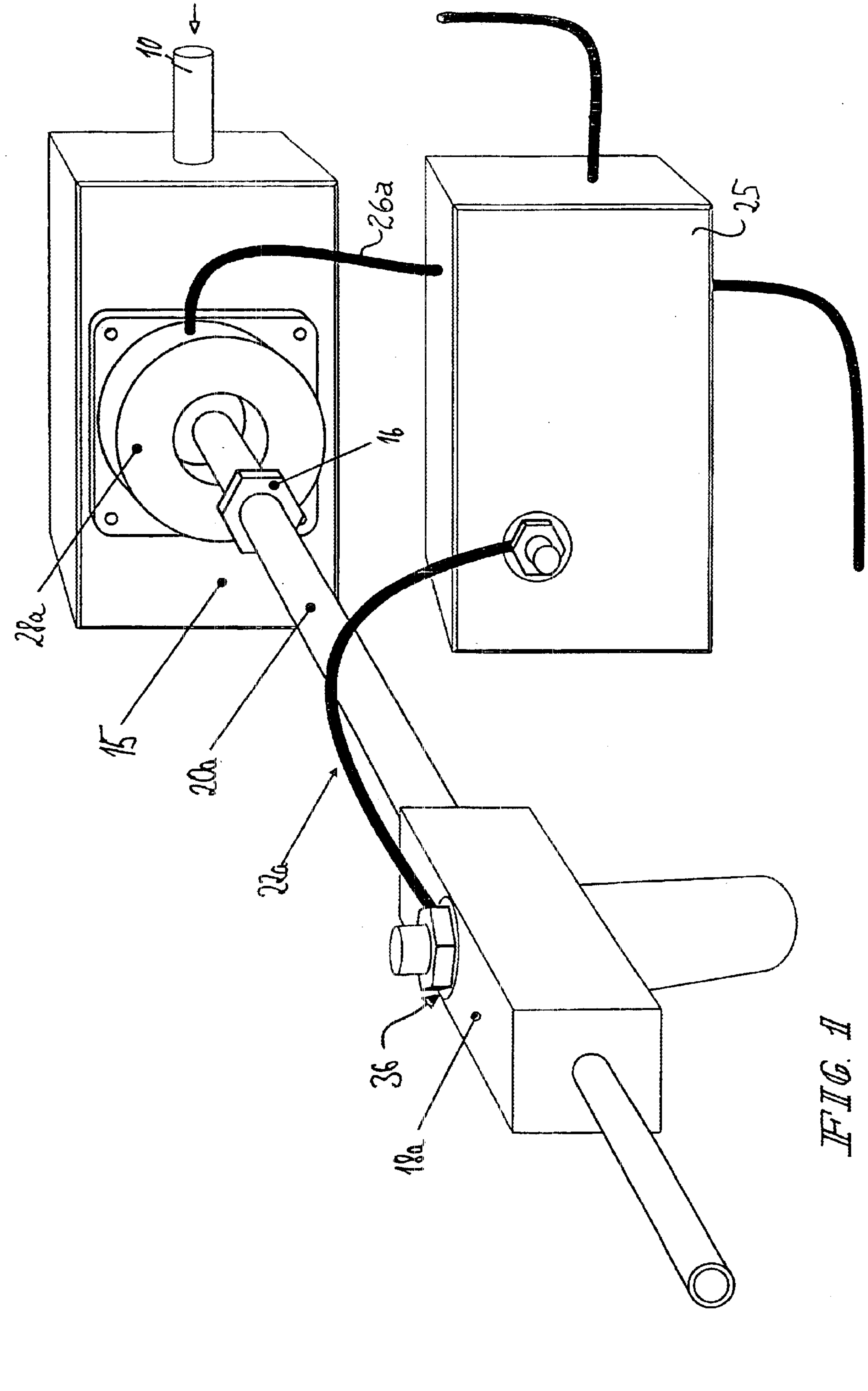
FIG. 1 is a schematic view of a high-pressure cleaning system having a spray gun according to the principles of the present invention.
Figure 3:
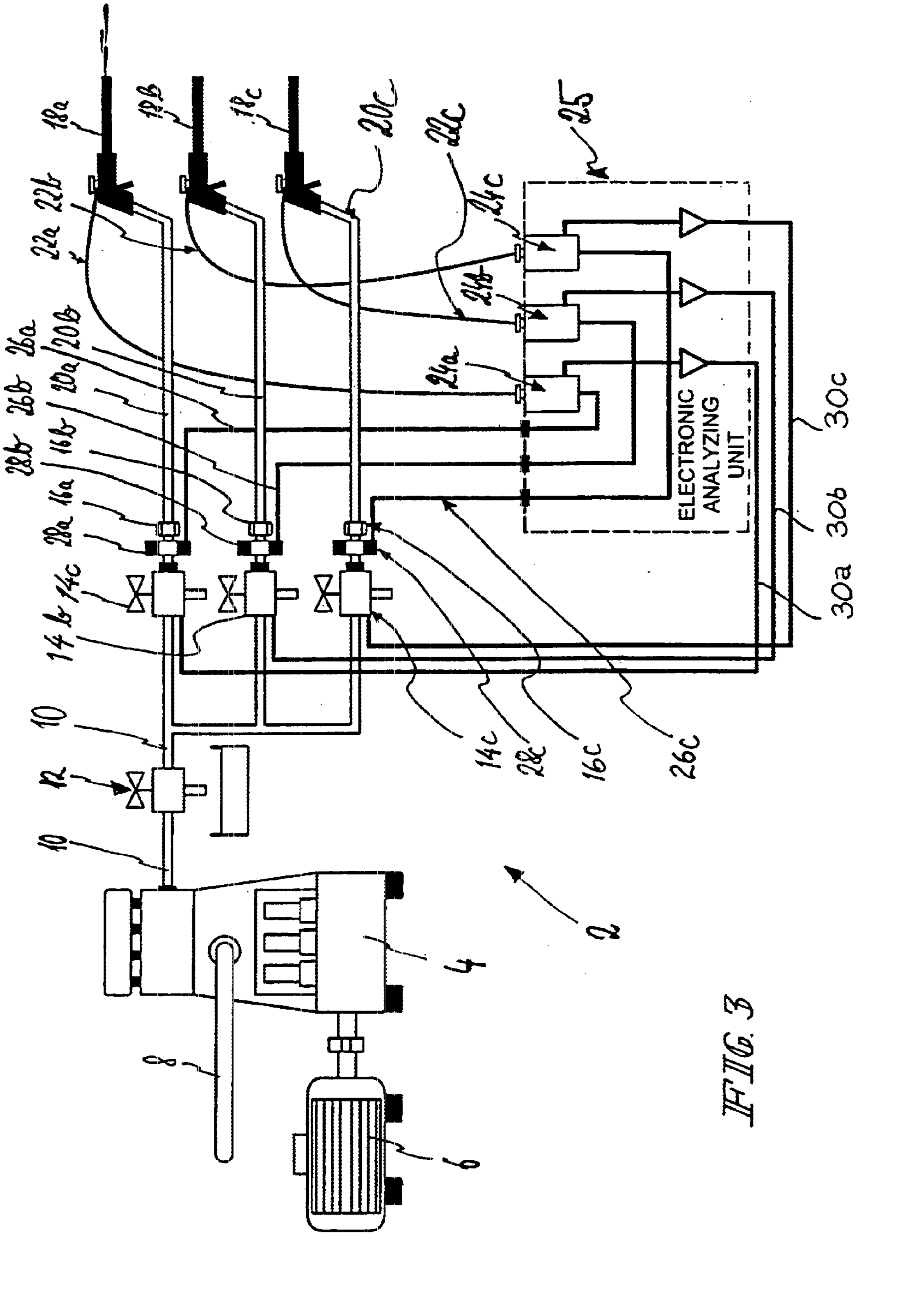
FIG. 3 is a schematic view of a high-pressure cleaning system having three spraying devices according to the principles of the present invention.

FIG. 3 illustrates a high-pressure cleaning system 2 having a high-pressure pump 4 to which a drive 6 is assigned. Water at the water admission pressure required for the pump is fed by line 8 to the high-pressure pump 4. From the high-pressure pump 4, the water is guided by line 10 at a high pressure to a bypass valve 12, from which it can be guided by three switch valves 14*a–c* (for example, integrated in a high-pressure distributor; see, for example, reference number 15 in FIG. 1) to three hose connections 16*a–c*. One spraying device respectively each having one spray gun 18*a*–18*c* can be connected to these hose connections 16*a–c*, which spraying devices can be connected by high-pressure hose lines 20*a*–20*c* with the hose connections 16*a–c*.

Figure 2:
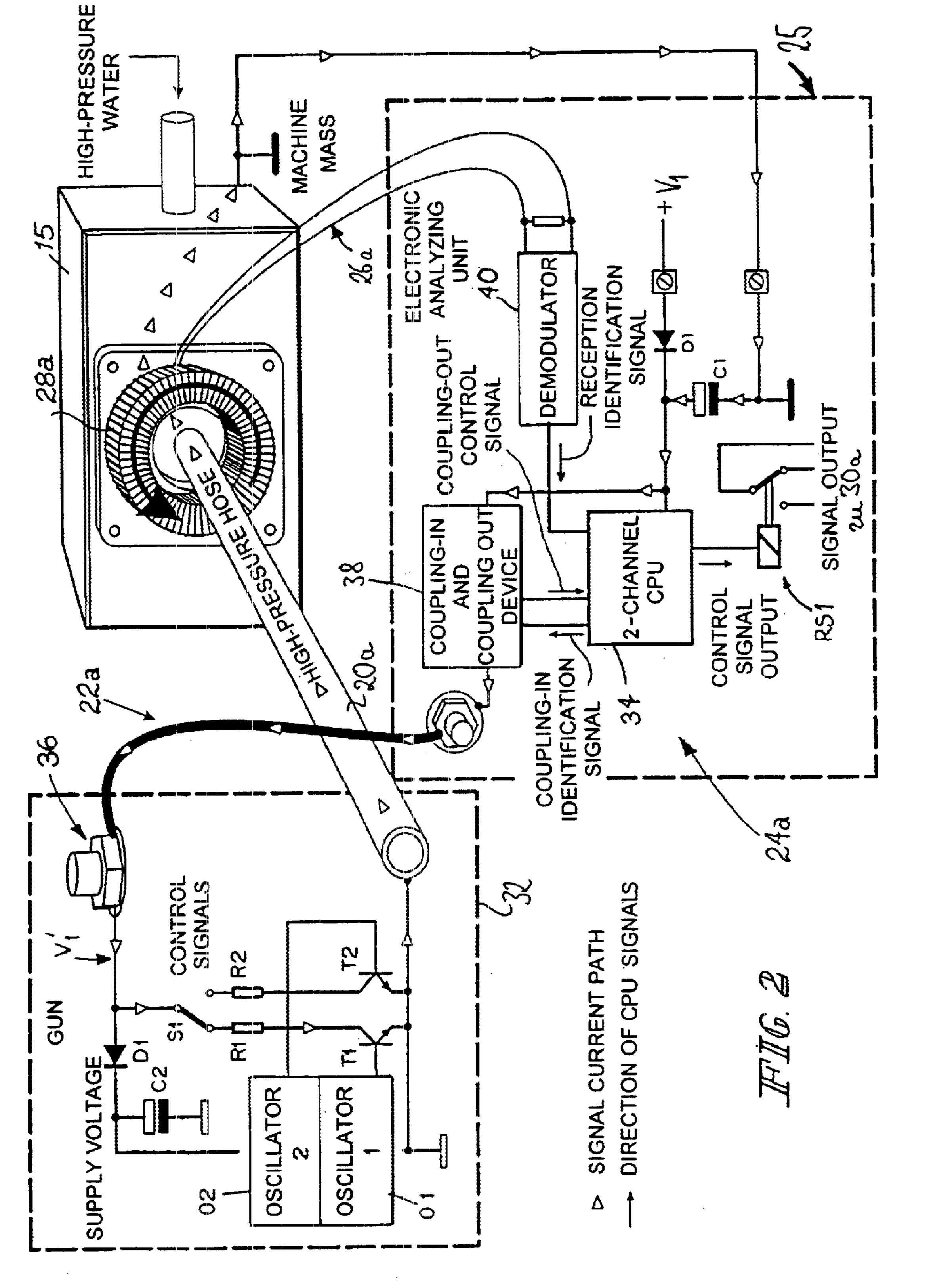
FIG. 2 is a schematic representation of a control arrangement for a high-pressure cleaning system according to FIG. 1.

By single-wire lines 22*a–c*, the spray guns 18*a–c* are connected with analyzing circuits 24*a–c* which can be combined in a single housing or can be accommodated in respective individual housings 25 (see FIG. 2).

In the circuit example of FIG. 3, the spray gun 18*c* was "accidentally" connected to the "wrong" analyzing circuit 24*b* and the spray gun 18*b* was connected to the "wrong" analyzing circuit 24*c*. The analyzing circuits 24 can detect and process this faulty condition, which will be explained in detail below.

Signals of the sensors 28*a–c* are supplied to the analyzing circuits 24*a–c* by input lines 26*a–c*, which sensors 28*a–c* are, in each case, assigned to the hose connections 16*a–c*. The outputs of the electronic analyzing unit 24 are connected by electric lines 30*a–c* with respective control inputs of the switch valves 14*a–c*.

The more detailed construction of the control of the spraying device is illustrated in FIG. 2. One of the control devices for the spray gun 18*a* is shown here as an example.

The control device comprises an analyzing circuit 24*a* which is connected by the single-wire line 22*a* with a gun or spray circuit 32 at the spray gun 18*a*.

The analyzing circuit 24*a* has a two-channel (for forming another safety step) CPU (such as a two-channel microcontroller) 34, which controls the switch valve 14*a* by the signal outputs of these channels, relays RS1 (of which relays RS1 only one is shown for the purpose of clarity) and line 30*a*, and, as a result, releasing or blocking the water supply to the spray gun 18*a*.

By way of a diode D1 and a condenser C1 connected between V1 and the mass or ground, a direct supply voltage V1 is applied to the CPU 34.

This supply voltage V1' is connected (for example, by a resistor not shown here) by the single-wire line 22*a* also with the gun circuit 32 at the spray gun 18*a*. Among other things, V1', by a diode D2 and a condenser C2 which is connected between the supply voltage and the mass or ground, supplies oscillators O1, O2. It is also applied by a switch S1, which forms the on/off device of the spray gun, depending on the switch position by a first or a second resistor R1, R2 in each case to the input of a transistor T1 or T2. The control inputs of transistors T1 and T2 are each connected with the output of an oscillator O1 and O2 (for example, a two-channel microcontroller; processor). The outputs of the transistors T1, T12 are each connected with the high-pressure hose 20*a* into which an electric line is integrated (or to which an electric line is assigned as a fixed connection), which is formed particularly by a metallic fabric. On the connection side to the switch valve 14, this metallic fabric is connected by the connection 16 with the machine mass or ground of the high-pressure pump 4, to which the connection to ground of the analyzing circuit 24*a* is also applied.

Figure 4:
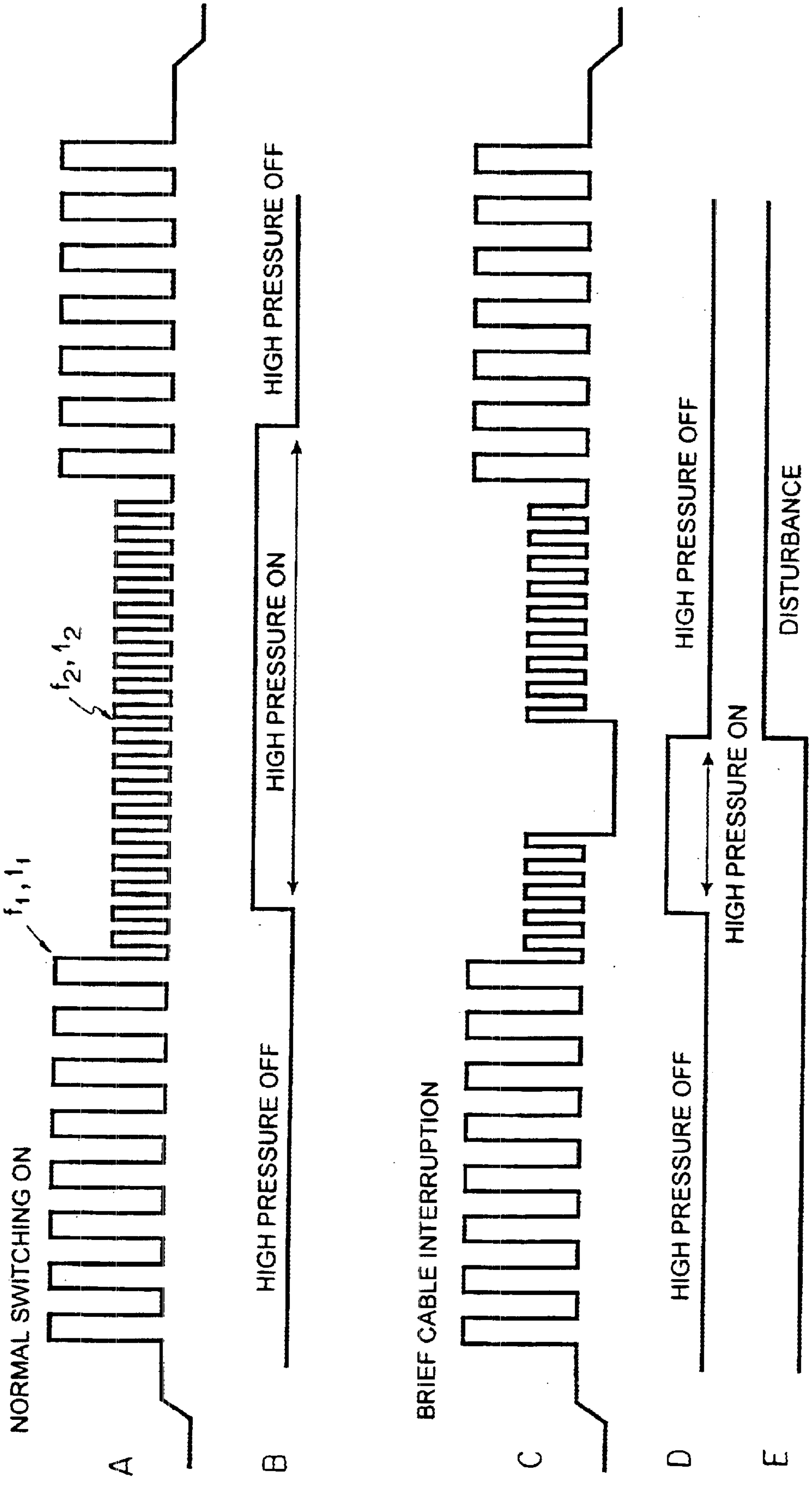
FIG. 4 is a pulse diagram for illustrating the functioning of the present invention.

In this manner, depending on the position of the switch S1, the frequency f1 of oscillator O1 or f2 of oscillator O2 and the amplitude can be transmitted from the spray circuit 32 and detected by a coupling-in and coupling-out device 38 of the analyzing circuit 24 (for example, by detecting the voltage drop at a resistor with an amplifier connected on the output side and a filter connected on the output side of the amplifier) and is analyzed by the CPU 34 with respect to its frequency and amplitude behavior (see FIG. 4).

Depending on the position of the switch S1, either a signal with a frequency f1 and an amplitude A1 or a signal with a frequency f2 and an amplitude A2 is applied to the CPU. The CPU 34 or a channel of the CPU 34 compares this signal with defined reference values and correspondingly switches the water supply to the spray gun 18*a* on or off by the relay RS1 (and, in the case of two CPU channels, by way of a relay RS2, not shown), the line 30*a* and the switch valve 14*a*.

For example, in the case of the switch position "off" on the spray gun 18*a*, 1 kHz, as the frequency f1, and a higher amplitude and, in the case of the switch position "on", an amplitude A2, which is lower than the first amplitude, and a frequency f2 of 2 kHz are transmitted.

The switching information is therefore transmitted redundantly with a current or amplitude and frequency information, which increases the safety of the control circuit. In addition, the current or amplitude information is transmitted as differential information so that possible leak currents can be additionally detected during the analysis.

In this manner, by means of only one separate single-wire line 22*a* to the mass or ground connection in the high-pressure hose 20, the switching-on and switching-off of the spray gun 18 is permitted without the requirement of a higher-expenditure multi-wire line and a higher-expenditure and more expensive special connector between the spray gun 18*a* and the switch valve 14*a* or the analyzing circuit 24*a*. This additional single-wire line 22*a* is preferably fastened directly to the high-pressure hose 20*a* and is assigned to the latter so that it cannot be lost.

In the event of a line breakage or any other disturbance, the system will block the dangerous on-position. Leak current to a certain defined level can be permitted without interfering with the data transmission because only the differential signal is analyzed.

The analysis can be carried out by a single processor 34 or by two processors or two channels of the CPU 34. Correspondingly, one relay RS1 or—for increasing safety—two relays can be connected to the output side of the CPU.

Simple terminals 36 (see FIG. 1), for example, are suitable for the connection of the single-wire line 22*a* to the spray gun 18*a* and the housing 25. An expensive and high-expenditure connector, as in the case of a four-wire solution, will no longer be required.

In a supplementary manner, the circuit of FIG. 2 also provides the possibility of checking the correct connection of the spray guns 18*a* to 18*c* at their pertaining connection 16*a–c*. This solves the following problem. In systems with several high-pressure connections 16*a–c*, there is the risk that high-pressure hoses or the pertaining spray guns are assigned to a wrong connection 16*a–c*. Thus, during the switching-on, a wrong spray gun may be acted upon by high pressure.

A situation of this type is illustrated in FIG. 3, in which the spray guns 18*b* and 18*c* were "exchanged with one another"; that is, spray gun 18*b* was connected to circuit 24*c*, and spray gun 18*c* was connected to circuit 24*b*.

The invention provides a monitoring circuit for solving this problem. This monitoring circuit utilizes a closed current path from the analyzing circuit 24*a* by the single-wire line 22*a* to the spray gun 18*a* and by the high-pressure hose 20*a* or its mass or ground connection back to the machine mass or ground for the transmission of an identification signal which is detected by the detector 28*a* and is analyzed by the CPU 34 of the analyzing circuit 24*a*.

In this case, the CPU 34 is utilized for impressing one identification signal respectively (for example, by means of a transistor) to the supply voltage V1 to the gun circuit 32 at the spray guns 18 by the single-wire line 22*a*. A 100 kHz signal and/or an identification, for example, is modulated onto the supply voltage V1.

By way of the metallic fabric or the mass or ground connection of the high-pressure hose 20*a–c*, the signal flows back to the machine mass or ground, a detector (for example, inductively or capacitively) being provided for detecting the variation of the current signal. According to FIG. 2, a coil is used as the sensor 28*a* which is wound around a metal ring which reaches around a high-pressure line section behind the connection 16 (viewed from the high-pressure line 20). The output signal of the detector 28*a* is supplied to a demodulator 40 whose output is, in turn, connected with inputs of the CPU 34.

If the spray guns 18*a–c* are exchanged for one another at the connections 16*a–c*, the signal will not travel by way of the circuit from the coupling-in and coupling-out device 38 by way of the single-wire line 22*a*, the spray gun circuit 32, the high-pressure hose 20*a*, the detector 28*a* and the demodulator 40 back to the processor 34. This means that a fault is present. In this event, the CPU 34 does not connect the relay/s RS1 (and possibly RS2). In this manner, a protection against an exchange is ensured by means of the simplest devices (coupling-in device: for example, a transistor; sensor 28*a*, demodulator 40, corresponding identification program for the CPU).

The sensor 28*a* could also be utilized—not shown here—for changing additional information (such as the pressure)

and/or detecting "emergency off" from the gun circuit 32 (which, for this purpose, would have to impress a corresponding additional information on the signal), for example, from the spray gun 18 to the CPU 34, in order to initiate, for example, a pressure control there.

When switch S1 is in its first position, the first oscillator $O_1$ through transistor T1 provides a signal as illustrated in FIG. 4 at graph A of a higher amplitude $A_1$ and lower frequency $f_1$ than that of the second switch position which is at a higher frequency f2 and a lower amplitude at $A_2$ from oscillator $O_2$. Graph B illustrates the control signals provided by the analyzing circuit 24 for the signal of Graph A to control the high pressure to the spraying device. Graph C shows the same sequence, except that in the middle of the high pressure on, there is a loss of signal in the middle of output of oscillator 2. As graph D shows, initially, the response of the analyzing circuit is the same as Graph B to maintain the high pressure off until the second oscillator signal is received and then turning the high pressure on. With the interruption of the signal, the analyzing or monitoring circuit 24 signifies a disturbance as illustrated by graph E. As will be noted from graphs A and C, the modulation is on top of the current signal which is the base line signal. The interruption goes down to zero.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A control arrangement for a high-pressure cleaning system having a high-pressure pump and at least one spraying device which can be connected to the high-pressure pump by a high-pressure hose, the control arrangement comprising:

at least one spray circuit at the spraying device;

at least one analyzing circuit connected with the spray circuit and situated at a high-pressure distributor or on a high-pressure pump of a machine for determining the switching condition of an on/off switch on the spraying device;

the at least one spray circuit being connected by a conductive connection at the high-pressure hose with the machine and having an on/off switch and at least one oscillator by means of which a signal identifying the switching condition of the switch can be impressed on current flow to the analyzing circuit; and a single-wire connection between the at least one spray circuit and the at least one analyzing circuit, by means of which a supply voltage is applied to the spray circuit.

2. The control arrangement according to claim 1, including an analyzing circuit for each spray circuit.

3. The control arrangement according to claim 1, including a switch valve for releasing or blocking the water supply to the spraying device and wherein the analyzing circuit includes a CPU which controls the switch valve by a relay.

4. The control arrangement according to claim 3, wherein the CPU has two channels each connected to a relay.

5. The control arrangement according to claim 1, wherein the supply voltage is applied to the analyzing circuit, and the supply voltage is connected by the single-wire line to the spray circuit.

6. The control arrangement according to claim 1, wherein the supply voltage can be applied by the on/off switch of the spray circuit to an input of at least one transistor whose control input is connected with the output of the at least one oscillator.

7. The control arrangement according to claim 6, wherein an output of the transistor is connected with the conductive connection of the high-pressure hose to the machine.

8. The control arrangement according to claim 6 wherein the supply voltage can be applied by the on/off switch of the gun circuit to the input of either a first or second transistor whose control inputs are connected respectively with the output of a first and second oscillator.

9. The control arrangement according to claim 8, wherein the first and second oscillators have different frequencies.

10. The control arrangement according to claim 9, wherein the first and second oscillators have different amplitudes.

11. The control arrangement according to claim 1, wherein the conductive connection includes a metallic fabric surrounding the high-pressure hose.

12. The control arrangement according to claim 1, wherein a coupling-in and/or coupling-out device connects a CPU to the single wire connection.

13. The control arrangement according to claim 12, wherein the coupling-in and/or coupling-out device couples the signal modulated by the oscillator in the spray circuits onto the supply voltage by way of the machine.

14. The control arrangement according to claim 1, wherein the signal identifying the switching condition is transmitted redundantly with an amplitude information and a frequency information and can be analyzed by the analyzing circuit.

15. The control arrangement according to claim 1, wherein the single-wire line is connected by terminals to the spray circuit and the analyzing circuit.

16. A control arrangement including a monitoring circuit for the protection of a high-pressure cleaning system having several spray guns, which can be connected to the high-pressure, cleaning system by high-pressure against faulty connections and/or exchanges of the spray guns at the connections assigned to them, the control arrangement comprising:

the monitoring circuit having closed circuits each including analyzing circuit at a machine connected to a respective spray gun circuit on the spray gun by a single-wire line and by electric connection assigned to the high-pressure hose to the machine;

a coupling-in device assigned to a CPU in analyzing circuit, by means of which coupling-in device one identification signal respectively is impressed onto the current to the spray gun circuit at the spray guns by the single-wire line; and one sensor assigned to each connection to the machine for sensing the variation of the current signal.

17. The control arrangement according to claim 16, the sensors have an inductive or capacitive design.

18. The control arrangement according to claim 16, wherein the sensors are coils around a ring which is around a line section at the connection to the machine.

19. The control arrangement according to claim 16, wherein each sensor is connected with a demodulator whose outputs are connected with inputs of the CPU.

* * * * *